Patented Feb. 24, 1948

2,436,616

UNITED STATES PATENT OFFICE 2,436,616

DEHYDROGENATION PROCESS

Simpson D. Sumerford, Baton Rouge, La., assignor to Standard Oil Development Company, a corporation of Delaware No Drawing. Application March 16, 1945, Serial No. 583,172

8 Claims. (Cl. 260—669)

My invention is disclosed in the following specification and claims:

The object of my invention is to provide a commercially feasible process, and in particular a suitable catalyst therefor which will enable the dehydrogenation of mono-olefins or alkylated aromatics in a manner which is expeditious and economical.

It is a matter of record in various prior patents and publications to dehydrogenate butenes or other olefins and/or ethyl benzene to form the corresponding diolefin and styrene, respectively. By and large, however, the prior art processes employ catalysts which contain a spacing agent such as alumina upon which is carried the active dehydrogenation catalyst. Processes using alumina as the predominant component of the catalyst must be operated under rather high vacuum to prevent polymerization of the nascent product in the reaction zone, or else, a diluent must be present in the reaction zone to reduce the partial pressure of the olefin. In any event steam cannot be used because it attacks the alumina and immediately reduces the activity of the catalyst as a whole.

I have discovered a class of active catalysts which may be successfully employed in the dehydrogenation of mono-olefins containing at least four carbon atoms in the molecule and also of alkylated aromatics containing at least two carbon atoms in the side chain, to produce diolefins and aromatic alkylenes, respectively, in improved yields.

In general, my catalysts consist essentially of magnesia as the support, iron oxide as the active component, and potassium chromate. Instead of iron oxide I may use other heavy iron group metal oxides such as cobalt oxide and nickel oxide. Also, the base, magnesia, is not indispensable and I may use a catalyst consisting of say iron oxide and potassium chromate.

In the prior application of Kenneth R. Kearby, Serial No. 430,873 filed February 14, 1942, now U. S. Patent 2,395,875, there is disclosed a method of dehydrogenating mono-olefins and alkylated aromatics employing as a catalyst magnesia, iron oxide, copper oxide and potassium oxide (as the preferred composition; except for the copper oxide whose presence in the composition is less essential than the other components). That catalyst has gone into wide commercial use in the process of producing butadiene and styrene. However, by subsequent research, I have found that potassium chromate in catalyst composition greatly improves the catalyst of the said Kearby application in at least two important respects as follows:

1. It increases the activity of the catalyst.
2. It prevents or retards loss of potassium by volatilization at the high temperatures employed during the dehydrogenation reaction.

Both of these factors are, of course, very important. For instance, the commercial units now using the Kearby catalyst must have potassium added, at least periodically, to the catalyst mass to replace that lost by volatilization. This is accomplished usually by dissolving $K_2CO_3$ in water and injecting it into the steam fed to the reaction zone.

Another important attribute of my catalyst is the relative simplicity and low cost at which it may be manufactured. It is made by simply mixing in the dry powder state say 80 parts by weight of calcined MgO and 20 parts calcined $Fe_2O_3$. An aqueous solution containing 10 parts by weight of $K_2CrO_4$ is added, and enough water is introduced to form a thick paste which is dried at 300° F., heated to 1200° F., and then pilled in a pilling machine.

For good results the amount of magnesia may vary from 51 to 95 weight per cent (or may be omitted altogether), the iron oxide may vary from 20 to 95 weight per cent and the potassium chromate from 1 to 10 weight per cent. But it is best to maintain at least 5 weight per cent of potassium expressed as $K_2O$ in the catalyst, for this quantity insures good conversions, high selectivity, and also retards coke formation on the catalyst. This last-mentioned attribute is also very important, for it enables me to operate on extended productive time periods before the catalyst need be regenerated, or replaced by fresh catalyst. In the dehydrogenation, reaction results unavoidably in the deposition of coke material on the catalyst. These coke deposits, of course, impair the activity of the catalyst. Eventually the catalyst must be regenerated by burning off the deposits by treatment with steam or steam and some oxygen containing gas. The presence of potassium chromate in my catalyst however, causes the newly formed carbonaceous material or coke to be converted to CO and $CO_2$ and thus eliminated with the product stream from the reaction zone. Actually, of course, some coke will persist on the catalyst and require discontinuance of the reaction to remove it. But the time periods during which my catalyst may be employed without regeneration are extended to 2–6 hours. As indicated, the catalyst is not injured by contact with superheated steam and is regenerable thereby.

To show the utilities of my invention I set forth below the results of a number of runs made in which butene was dehydrogenated under the following conditions: temperature, 1155° F., to 1180° F.; total pressure in the reaction zone, 1 atmosphere; 12 volumes of steam fed to the reaction zone per volume of butene; and a feed rate of 500 volumes of n-butene per volume of catalyst per hour. The catalyst in the form of pills was placed in the reaction zone and the reactants passed downwardly there-through. The catalyst analyzed: MgO, 80 weight parts, Fe₂O₃, 20 weight parts; K₂CrO₄ 10 weight parts.

The results were as follows during 78 cycles consisting of a 1-hour reaction phase and a 1-hour regeneration phase to wit:

*Steam-butene dehydrogenation catalyst with stable promoter*

| Cycle No. | Conversion, Vol. Per cent | Yield, Vol. Per cent | Selectivity, Per cent | $K_v 1200$ |
|---|---|---|---|---|
| 9 | 19.1 | 15.1 | 79 | 20 |
| 21 | 22.0 | 16.0 | 73 | 31 |
| 33 | 25.1 | 18.3 | 73 | 38 |
| 54 | 31.8 | 21.8 | 69 | 44 |
| 68 | 28.0 | 19.6 | 70 | 33 |
| 78 | 29.5 | 21.5 | 73 | 39 |

The catalyst was analyzed at the end of the 78th cycle (156 hours of use) and showed 4.83 weight per cent potassium expressed as K₂O, as compared with 5.14 weight per cent on the fresh unused catalyst, thus indicating substantially no effective loss of catalyst.

Under the heading $K_v1200$, I have set forth the catalyst activity as a figure obtained by inserting the data in the formula:

$$K_v = \frac{v./v./Hr.}{100}(a \ln a - a \ln(a-x) - x)$$

Where $a$ = the concentration of butene (in mols)
$x$ = the per cent of butene converted By plotting the result of the calculations for several different temperatures on the form of a curve, I obtain the value at 1200° F., which value I have designated "$K_v1200$."

Another fact shown by the data is that the catalyst was actually gaining in activity after 156 hours of use, thus establishing long catalyst life, or expressed otherwise, there is a long time period during which it may be used before it becomes necessary to replace it. The catalyst may be used for 5000 hours or more before it is necessary to reject the same.

Still another fact brought out clearly by the data is that the conversions per pass are high, and the "selectivity" or ultimate yield is also high.

As to conditions, the following give good results:

| | |
|---|---|
| Temperature | 1100° to 1400° F. |
| Pressure (total) | Atmospheric or higher |
| Steam dilution | 1 to 20 mols of steam per mol butene |
| Feed rate of butene | 100 to 1000 volumes of butene per volume of catalyst per hour |

As indicated previously my process is adapted to dehydrogenate alkylated aromatics such as ethyl benzene, isopropylbenzene (to give alpha-methyl-styrene) and the higher homologues, in good yields using the aforementioned catalysts and operating conditions.

To the expert in this field, numerous modifications of my invention fall within the spirit thereof, and it is my intention to claim the invention as disclosed insofar as it is limited by the terms of the appended claims.

What I claim is:

1. The method of dehydrogenating butene to form butadiene which comprises mixing said butene with steam and contacting the mixture at temperatures of from about 1100° to 1400° F., in a reaction zone, with a catalyst consisting of a major portion of magnesia, a minor proportion of iron oxide and an amount of potassium chromate less than that of either of the first named components.

2. The method of producing styrene which comprises mixing ethyl benzene with steam and forcing the mixture through a reaction zone, containing a catalyst consisting of a major proportion of magnesia and minor proportions of iron oxide and potassium chromate, while maintaining the reaction zone under about atmospheric pressure and a temperature in the range of from about 1100° to 1400° F. and permitting the reactants to remain in the reaction zone until the desired conversion is effected and thereafter recovering from said reaction zone, a crude product containing styrene.

3. The method of claim 2 in which alpha methyl styrene is produced by charging isopropyl benzene to the reaction zone containing the catalyst and utilizing the same conditions therein specified.

4. The method of dehydrogenating butene to form butadiene which comprises mixing the butene with a major volume proportion of steam and contacting the mixture at a temperature of 1155° F. to 1180° F. in a reaction zone with a catalyst consisting of 80 parts by weight of magnesium oxide, 20 parts by weight of iron oxide, and 10 parts by weight of potassium chromate.

5. The method of dehydrogenating a hydrocarbon selected from the class consisting of mono-olefins containing at least 4 carbon atoms to the molecule and cyclic hydrocarbons containing a benzene nucleus and at least two carbon atoms in an alkyl substituent group, which comprises contacting said hydrocarbons admixed with steam at temperatures of from about 1100° F. to 1400° F. with a catalyst the active component of which consists of an iron group metal oxide promoted by a smaller amount of potassium chromate.

6. The method of claim 5 in which the catalyst contains magnesia as a base.

7. The method of claim 5 in which the iron group metal oxide is iron oxide and the catalyst consists of iron oxide promoted by the smaller amount of potassium chromate.

8. The method of dehydrogenating a hydrocarbon selected from the class consisting of mono-olefins containing at least four carbon atoms in the molecule and cyclic hydrocarbons containing a benzene nucleus having at least two carbon atoms in an alkyl substituent group, which comprises contacting said hydrocarbon admixed with steam at temperatures of from about 1100° F. to 1400° F. in a reaction zone with a catalyst consisting of a major proportion of a steam-resistant, magnesia-containing base, a minor proportion of iron oxide as the active dehydrogenating component of the catalyst, and an amount of potassium chromate less than of the iron oxide, the magnesia and the iron oxide being the major ingredients of the catalyst.

SIMPSON D. SUMERFORD.

REFERENCES CITED

The following references are of record in the file of this patent:

UNITED STATES PATENTS

| Number | Name | Date |
|---|---|---|
| 2,122,787 | Tropsch (A) | July 5, 1938 |
| 2,148,140 | Tropsch (B) | Feb. 21, 1939 |
| 2,184,235 | Groll et al. (B) | Dec. 19, 1939 |
| 2,257,082 | Yarnell | Sept. 23, 1941 |
| 2,270,165 | Groll et al. (A) | Jan. 13, 1942 |
| 2,335,550 | Sturgeon | Nov. 30, 1943 |
| 2,364,562 | Stowe | Dec. 5, 1944 |
| 2,370,798 | Kearby | Mar. 6, 1945 |
| 2,371,087 | Webb et al. | Mar. 6, 1945 |
| 2,376,191 | Roetheli et al. | May 15, 1945 |
| 2,401,802 | Taylor et al. | June 11, 1946 |